July 12, 1938. E. H. J. C. GILLETT Re. 20,792
TRANSMISSION SYSTEM
Original Filed Dec. 7, 1929 3 Sheets-Sheet 1
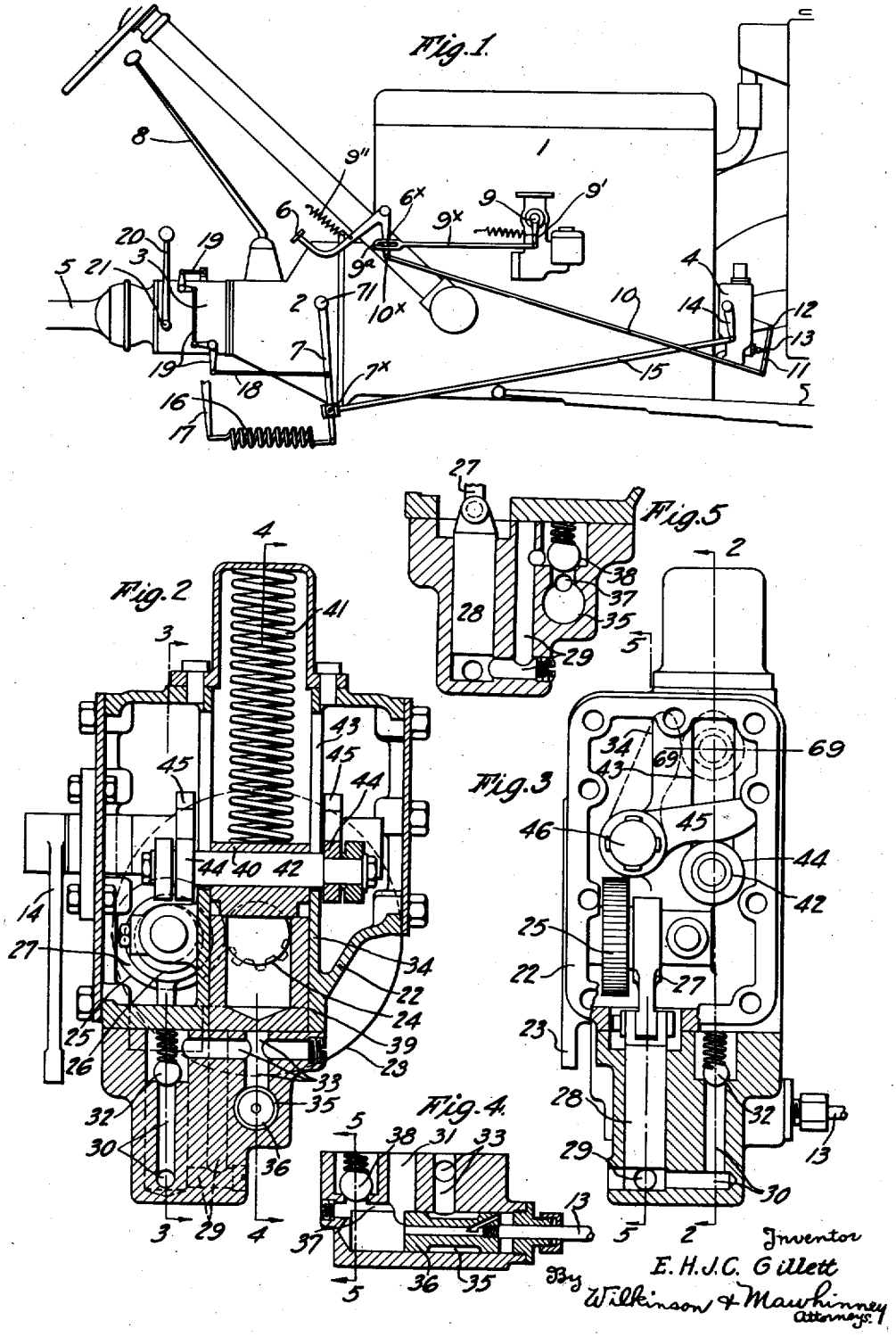

July 12, 1938. E. H. J. C. GILLETT Re. 20,792

TRANSMISSION SYSTEM

Original Filed Dec. 7, 1929 3 Sheets-Sheet 2

Inventor

E. H. J. C. Gillett

By Wilkinson & Mawhinney

Attorneys.

July 12, 1938. E. H. J. C. GILLETT Re. 20,792

TRANSMISSION SYSTEM

Original Filed Dec. 7, 1929 3 Sheets-Sheet 3

Inventor

E. H. J. C. Gillett

By Wilkinson & Mawhinney

Attorneys.

Reissued July 12, 1938

Re. 20,792

UNITED STATES PATENT OFFICE 20,792

TRANSMISSION SYSTEM

Edward Henry James Cecil Gillett, West Hempstead, London, England; Hilda Cohen, executrix of will of said Edward Henry James Cecil Gillett, deceased, assignor to Reduction Gears Limited, London, England Original No. 1,923,819, dated August 22, 1933, Serial No. 412,461, December 7, 1929. Application for reissue July 23, 1935, Serial No. 32,808. In Great Britain July 23, 1929

36 Claims. (Cl. 192—.01)

The present invention relates to transmission systems of motor vehicles.

An object of the invention is the provision of a clutch whereof the engagement is independent of the skill of the operator and is automatically effected in a smooth and progressive manner.

Another object is the facilitation of the operation of "gear-changing" in a power transmission system having variable speed-gearing by the elimination of the operation of a separate clutch control whenever the operation of "gear-changing" is to be carried out.

A further object is the provision of means for completely isolating such variable speed gearing in a power transmission system both from the prime mover and the driven mechanism, thus further facilitating the operation of "gear-changing".

In order that the nature of the present invention and the manner in which it is to be carried out may be more fully understood, one form of construction as applied to a motor vehicle transmission system is described with reference to the accompanying drawings, wherein:

Fig. 1 represents a schematic view of part of a motor vehicle embodying the present invention showing the general arrangement of a form of construction having clutch-operating power means directly operated by the prime mover, and denoted by the reference number 4 in Fig. 1.

Figs. 2, 3, 4 and 5 refer to the power means,

Fig. 2 being a transverse section along the line 2—2 in Fig. 3,

Fig. 3 a longitudinal view with the cover plate removed and partly sectioned along the line 3—3 in Fig. 2, Fig. 4 a longitudinal section of the lower part along the line 4—4 in Fig. 2, and Fig. 5 a transverse section of the lower part along the line 5—5 on Figs. 3 and 4, all views being according to the direction of the arrows.

Figure 6:
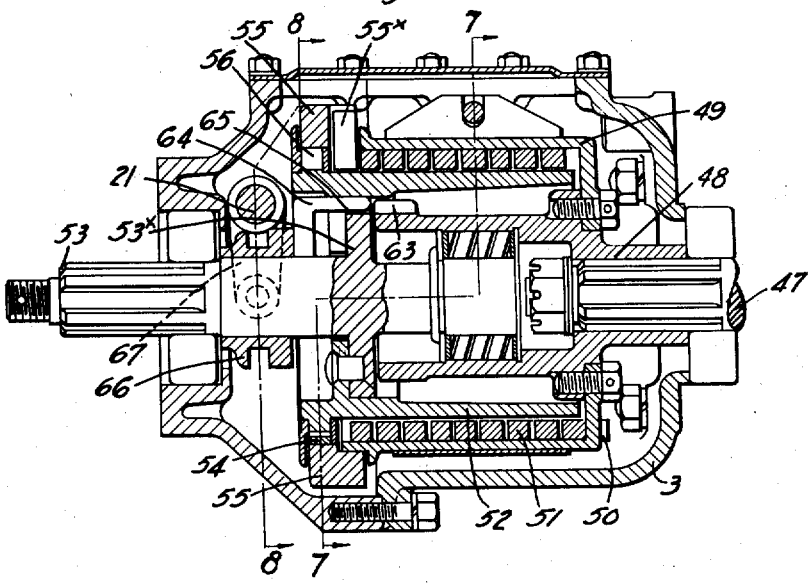
Figure 7:
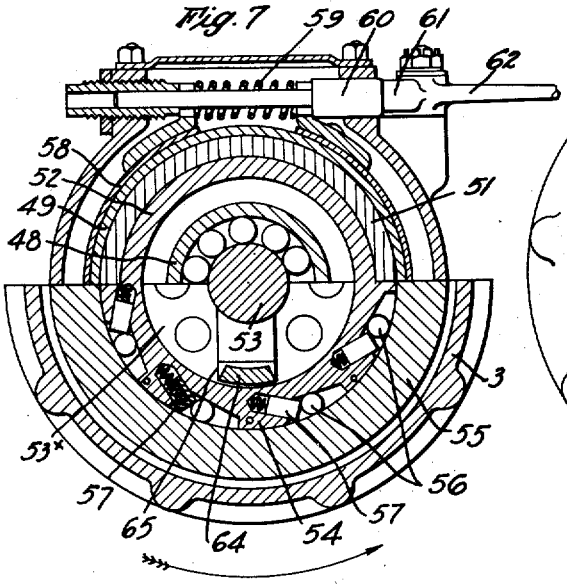
Figure 8:
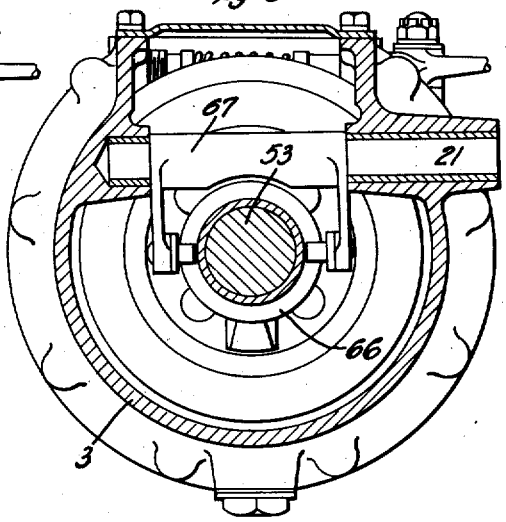
Figure 9:
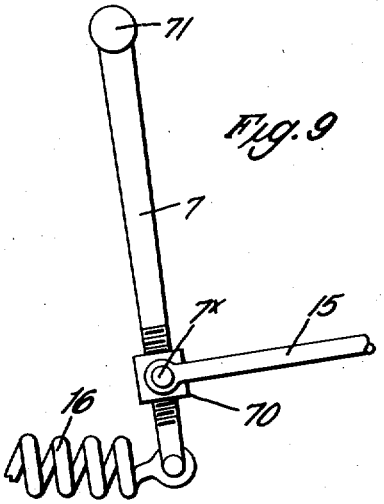
Figure 10:
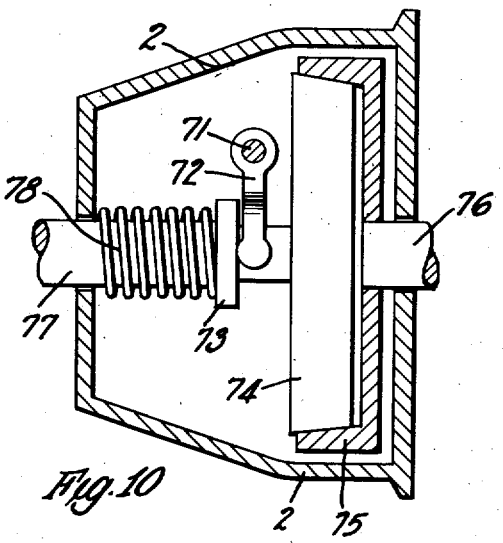

Figs. 6, 7 and 8 refer to a combined free wheel device, separately controlled dog clutch for reverse motion and clutch brake, denoted by the reference numbers 3, 20 and 21 in Fig. 1, Fig. 6 being a central longitudinal vertical section, Fig. 7 a transverse section along the line 7—7 in Fig. 6, Fig. 8 a transverse view partly sectioned along the line 8—8 in Fig. 6, the direction of the views being shown by arrows, Figure 9 is an enlarged view of the clutch operating lever, showing the method of adjustment, and Figure 10 is a diagrammatic view in vertical longitudinal section of the parts composing the clutch.

Referring to Figures 1, 9 and 10:

1 is an engine or prime mover unit, 2 a housing containing a friction clutch of the known type shown diagrammatically in Fig. 10 and consisting of a driving member 75 fast on the engine shaft 76 and a driven member 74 fast on a shaft 77. The clutch 74, 75 is engaged by springs 78 and disengaged by the fork 72 acting against a collar 73, the fork 72 being fast on a cross shaft 71 carrying an external clutch operating lever 7. The housing 2 also contains variable speed gearing driven by shaft 77 and controlled in the known manner by the lever 8. To the housing 2 is fixed a casing 3 containing the free wheel device, dog clutch and clutch brake illustrated in Figs. 6, 7 and 8. 5 is a torque tube containing a shaft (not shown) by which power is transmitted to the road wheels. A clutch-operating power device 4 is embodied in the engine unit 1 and is operatively connected to the clutch operating lever 7 by means of a lever 14 and a rod 15, the rod 15 being pivotally attached at $7^x$ to the lever 7. The pivot $7^x$ is carried on a nut 70 engaging with a screwed part of the shank of the lever 7, as shown in Fig. 9, so that the leverage of the rod 15 on the lever 7 may be adjusted by screwing the nut 70 along the lever 7. 6 is an accelerator pedal lever carrying a pin $6^x$ engaging a slot $9^a$ of a rod $9^x$ which operates an engine throttle valve 9 through the intermediary of a throttle arm 9'. The pedal lever 6 is biased to its off position by a spring 9''. The pedal lever 6 is also connected by means of a hinge $10^x$, a rod 10 and a lever 11 to a valve stem 13 of the power means 4 (see also Fig. 4), the lever 11 being pivoted at a fixed point 12. A tension spring 16 anchored to the vehicle frame at 17 is attached to the lever 7 which is further connected by means of a rod 18, and a train of bell cranks and rods 19 with a clutch brake within the casing 3 (see also Figs. 6, 7 and 8). A separate lever 20 is fixed to a shaft 21 passing within the casing 3 and operating the dog clutch for reverse motion (see Figs. 6, 7 and 8).

Referring to Figs. 2, 3, 4 and 5:

22 is a casing fixed to the engine by a flange 23 and having mounted within it a spur reduction gear 24, 25 driven by the engine and driving by means of an eccentric 26 and a combined eccentric strap and connecting rod 27, a plunger 28. The space below the plunger 28 is connected by means of a passage 29 with a non-return valve 38 and by means of a passage 30 with the non-return valve 32. A control valve comprising a chamber 35 and a piston 36 carrying an externally projecting stem 13 (see also Fig. 1) communicates by means of a passage 31 with the interior of the casing 22 and by means of passages 33 with a cylinder 34. The control valve also communicates with the non-return valve 38, which is kept continuously in communication with the passage 31 by means of the eccentrically bored passage 37. Slidably mounted in the cylinder 34 are a ram 39 and a block 40 which is mounted loosely on the ram and held against the ram 39 by a spring 41. The block 40 carries a pin 42 slidably mounted in guide slots 43 in the cylinder walls and carrying rollers 44 which bear against cam faced levers 45 keyed to a shaft 46, to which is also keyed the external lever 14 (see also Fig. 1).

Referring to Figs. 6, 7 and 8:

Within the casing 3 (see Fig. 6) a sleeve 48 is splined to a shaft 47 transmitting the drive from the variable speed gearing. To the sleeve 48 is fixed a flanged drum 49 to which is attached at 50 a coil spring 51. This latter surrounds and is adapted to grip a drum 52 fixed to a flange 53x integral with a driven shaft 53. On the drum 52 is formed a flange 54 having wedge-shaped peripheral notches surrounding which is a ring 55 to which is attached at 55x the free end of the spring 51. Lying in the notches of the flange 54 and between the latter and the ring 55 are rolling members 56 held in contact with the ring 55 and the inclined bases of the notches in the flange 54 by spring plungers 57.

Surrounding the flanged drum 49 is a brake band 58 spring loaded at 59 to keep it normally free of the drum and tightened by the pin 60, which is actuated by the cam 61 forming one arm of the lever 62 which is attached by its other arm to the train of cranks and rods 19 (see Fig. 1). One end of the sleeve 48 is formed into dogs 63 which are adapted to be engaged by dogs 64 axially slidable in slots 65 formed in the flange 53x and slidably operated by a grooved ring 66 and a fork 67 which is pinned to a shaft 21 to which is keyed the external lever 20 (see Fig. 1).

The method of operation is as follows:

Referring to Figs. 2, 3, 4, and 5, the casing 22 of the clutch-operating power means 4 is kept filled with oil to a level sufficient to drown all the operating parts. The rotation of the engine reciprocates the plunger 28 continuously, acting by means of the spur reduction gear 24, 25 and the eccentric motion 26, 27.

Oil is drawn from the interior of the casing 22 by means of the passages 31, 37, the non-return valve 38, and the passage 29. On the return stroke of the plunger, oil is delivered by means of the passage 30, the non-return valve 32, and the passages 33, to the cylinder 34 and the control valve. Normally the control valve is in a position allowing the oil to flow from the passage 33 back to the passage 31, thus by-passing the oil without doing any work.

Referring now to Fig. 1:

The first movement of depressing the accelerator 6 acting by means of the rod 10 and the lever 11 moves the stem 13 of the control valve outwards. The movement of the control valve piston 36 interrupts the communication between the passages 31 and 33 (the control valve is shown in this position in Fig. 4).

All the oil is now delivered to the cylinder 34, forcing the ram 39 and the block 40 upwards against the spring 41. The pin 42 being carried upwards by the block 40 and acting by means of the rollers 44, rocks the levers 45, the shaft 46, and the external lever 14. Since the cylinder 34 is in direct communication with the plunger 28 without the intervention of any oil accumulator device and the oil is practically incompressible, the travel of the ram 39, and hence of the lever 14, is dependent directly on the number of strokes made by the plunger 28. The lever 14, acting by means of the rod 15 and the clutch-operating lever 7, overcomes the force of the clutch disengaging spring 16 and allows the clutch 74, 75 to be engaged by its own engagement spring 78. When the ram 39 has travelled so far up the cylinder 34 as to uncover the lower ends of the guide slots 43, the oil in the space below the ram 39 is free to escape through the guide slots 43 back into the casing 22. Thus the slots 43 form an automatic bypass operative when the ram has completed its travel.

By means of the screw adjustment at 7x the relation between the travel of the ram 39 and the movement of the clutch operating lever 7 and hence the rate of engagement of the clutch may be varied to suit the speed and power of the engine. The cam faces of the levers 45 are so designed that when the ram 39 has reached the end of its travel and the clutch is fully engaged, the pressure between the cam faces and the rollers acts at right angles to the axis of the ram 39, thus relieving the ram of any axial loads other than that of the spring 41, side loads being communicated to the walls of the cylinder by the block 40 and not communicated to the ram since the block 40 is fitted loosely on the top of the ram 39. The position of parts 42, 44 and 45 when the ram has reached the end of its travel is indicated in Figure 3 in chain dotted lines, the line of action between the cam and roller being indicated at 69—69. The engagement of the clutch transmits the drive to the variable speed gear and so to the free wheel device illustrated in Figs. 6, 7 and 8. Referring to the latter, the drive is transmitted by the shaft 47 to the sleeve 48 and the drum 49 in the direction of the curved arrow in Fig. 7 for forward transmission of motion. This rotation is communicated to the end 50 of the coil spring 51, while its other end 55x, being attached to the ring 55, is prevented from rotating owing to the jamming action of the rollers 56 when the rotation is attempted in this direction with the shaft 53 stationary. The rotation of the end 50 of the coil spring 51 with the other end 55x held fast causes the coil spring 51 to tighten on the drum 52. Motion is thereupon transmitted to the drum 52, the flange 53x and the shaft 53. If the speed of the engine is reduced while the vehicle is running fast or descending a gradient the shaft 53 will tend to overrun the shaft 47. When this occurs, the jamming action of the rollers 56 will cease to operate, and the consequent slacking back of the ring 55 will allow the coil spring 51 to release its grip on the drum 52 and the shaft 53 will overrun the shaft 47 freely.

Since the coil spring 51 will only grip and transmit motion in the forward direction, motion in the reverse direction is transmitted by first engaging the dog clutch 63, 64 by means of the lever 20, the shaft 21, the fork 67, and the grooved ring 66. The dog clutch 63, 64 transmits motion in both directions, and as long as it is engaged there will be no free wheel effect.

Returning now to Fig. 1, release of the accelerator actuates the stem 13 of the control valve in the power means 4 in the reverse direction thus allowing the oil to be by-passed without doing work. The ram 39 is thereupon driven downwards by the spring 41, thus allowing the clutch to be withdrawn by the spring 16. At the same time the return movement of the lever 7, acting by means of the rod 18 and a train of bell-cranks and rods 19, actuates the lever 62 (see Fig. 7), which, acting in turn by means of the cam 61 and the pin 60, tightens a brake band 58, thus bringing the drum 49, the sleeve 48, and the shaft 47 to rest. Thus whenever the main clutch is disengaged, the elements of the variable speed gear are brought to rest.

The lost motion coupling $6^x$, $9^a$ between the accelerator 6 and the throttle 9 is so arranged that the movement of the accelerator 6 necessary for opening and closing the control valve of the servo-device is effected with the throttle 9 in the idling or minimum speed position, the pin $6^x$ moving idly in the slot $9^a$, while more extended movement of the accelerator 6 operates the throttle 9 by means of the pin $6^x$ and the rod $9^x$, with the control valve 13, 36 in the closed position, as shown in Figure 4, i. e. the servo-device is operative to engage and maintain engagement of the clutch 74, 75 and it may be noted that the valve piston 36 is arranged to have a sufficient idle travel with the valve closed to allow the throttle to be operated over its full range without disengagement of the clutch.

It will be appreciated that with the operation on the free wheel device in the location specified a very quick isolation of the variable speed gear is had through the cooperation of this free wheel device with the forward or front clutch and its operating mechanism.

While the free wheel device at the rear of the variable speed gear acts in its automatic capacity nevertheless this device is directly governed in its operation from the accelerator, or other control means, to the same extent as if a positive mechanical connection were made between them. However, the invention is simplified to the extent of doing away with any such extraneous mechanical connection and enabling the control of the free wheel device to be made through the shafting and variable speed gear. The free wheel device is quick acting so that when the control device quickly disengages the front clutch, which it is enabled to do because this front clutch is a quick-disengaging clutch, the control device also promptly acts on the free wheel device, which is also a quick-disengaging clutch, to at once disconnect the variable speed gear both from the motor in front and the road wheels at the rear. Thereby there is had immediately on the operation of the accelerator, or control means, a complete isolation of the variable speed gear which enables the gears to come to rest or to slow down to gear changing speed almost immediately and the gears may be shifted quietly and easily in a minimum space of time after operation of the accelerator or control means.

On the acceleration of the motor, or operation of the control means in an opposite direction, there is a progressive or gradual engagement of the forward or main clutch, which is entirely independent of any skill on the part of the operator of the vehicle, and this gradual engagement of the main clutch will not be in any way interfered with by the free wheel device at the rear but such free wheel device is quick engaging and will, therefore, take up the drive as soon as the main clutch is fully engaged.

What I claim is:

1. In a power transmission system including a prime mover and a driven shaft, a friction clutch, spring means tending to engage the clutch, clutch withdrawal spring means of greater strength than the engaging spring means, a power means independent of the driven shaft and deriving power from the prime mover to overcome the clutch withdrawal spring means and allow the engaging spring means to engage the clutch, said power means embodying incompressible operating means so that the rate of engagement of the clutch is proportional to the absolute speed of the prime mover, control means for the power means and automatic means operative when the clutch is fully engaged to limit the force exerted by the power means.

2. A power transmission system in accordance with claim 1 and including an adjustable connection between the power means and the clutch for regulating the rate of engagement of the clutch.

3. In a power transmission system including a prime mover, a speed control device herein referred to as the throttle and an accelerator; a friction clutch, clutch withdrawal spring means normally holding the clutch members out of engagement, clutch-operating power means embodied in the prime mover unit and comprising an hydraulic pump of the positive displacement type directly driven by the prime mover, an hydraulic ram actuated by said hydraulic pump and adapted to engage said clutch members against the resistance of said clutch withdrawal spring means, an hydraulic by-pass uncovered by said ram at the end of its travel whereby the working fluid may continue to circulate without doing work when the clutch members are fully engaged, a controllable by-pass, ram returning spring means, a "dead-centering" device whereby the clutch-operating power means is relieved of all loads other than that of the said ram returning spring means when the clutch is fully engaged and operative connections between the said controllable by-pass and the accelerator and between the accelerator and the throttle including lost motion devices so arranged that the accelerator operates the throttle with the controllable by-pass closed and opens and closes the said by-pass with the throttle in the minimum speed position.

4. A power transmission system in accordance with claim 3 and comprising clutch engaging spring means of less strength than the clutch withdrawal spring means.

5. In an automobile having a driving motor and an accelerator for regulating the speed of the motor, the combination with a clutch and means normally holding said clutch disengaged, of power means energized by the motor and adapted to engage the clutch, said power means employing incompressible operating means so that the rate of engagement of the clutch is proportional to the absolute speed of the motor, and means operatively connected to the accelerator for bringing the power means into action on accelerating the motor.

6. In an automobile having a driving motor and an accelerator for regulating the speed of the motor, the combination with a clutch and means normally holding said clutch disengaged, of power means directly driven by the motor and adapted to engage the clutch, said power means employing incompressible operating means so that the rate of engagement of the clutch is proportional to the absolute speed of the motor, and means operatively connected to the accelerator for bringing the power means into action on first accelerating the motor including lost motion means permitting acceleration of the motor after the servo-device has been rendered fully operative.

7. In an automobile having a driving motor and an accelerator for regulating the speed of the motor, the combination with a clutch and means normally holding said clutch disengaged, of clutch engaging power means comprising a hydraulic plunger pump directly and continuously driven by the motor, a clutch engaging hydraulic ram, an hydraulic connection between said pump and said ram, a bypass-valve and means operatively connected to the accelerator for closing the bypass-valve, so as to energize the ram, on accelerating the motor.

8. In an automobile having a driving motor and an accelerator for regulating the speed of the motor, the combination with a clutch and means normally holding said clutch disengaged, of clutch engaging power means comprising a hydraulic plunger pump directly and continuously driven by the motor, a clutch engaging hydraulic ram, a hydraulic connection between said pump and said ram, a bypass-valve and means operatively connected to the accelerator for closing the bypass-valve, so as to energize the ram, on first accelerating the motor, including lost motion means permitting acceleration of the motor with the by-pass valve closed.

9. In an automobile having a driving motor and an accelerator for regulating the speed of the motor, the combination with a clutch and means normally holding said clutch disengaged, of clutch engaging power means comprising a hydraulic plunger pump directly and continuously driven by the motor, a clutch engaging hydraulic ram, a hydraulic connection between said pump and said ram, a bypass-valve, means operatively connected to the accelerator for closing the bypass-valve, so as to energize the ram, on accelerating the motor, and an automatic relief bypass opened by the ram when it has completed its clutch-engaging travel.

10. In an automobile a driving motor, driven road wheels and a control and transmission system comprising in combination a power-operated clutch, a variable speed gear and a free-wheel device, the clutch being arranged between the motor and the variable speed gear and the free-wheel device between the variable speed gear and the driven road wheels, an accelerator for regulating the speed of the motor and an operative connection between the accelerator and the power-operated clutch, whereby movement of the accelerator to accelerate the engine brings the clutch into engagement and maintains engagement over the greater part of the accelerator range of movement, whereas on moving the accelerator to fully decelerate the engine, the clutch is disengaged and the free-wheel device permits the driven wheels to overrun, thus effectively isolating the variable speed gear.

11. The combination as claimed in claim 10 and including means for locking the free-wheel device to permit reverse drive to be transmitted to the driven wheels.

12. In an automobile a driving motor, driven road wheels, a variable speed gear, drive interrupting means for isolating the variable speed gear from the motor and the driven wheels including a free-wheel device between the variable speed gear and the driven wheels and a clutch between the motor and the variable speed gear, clutch disengaging means normally operative, power means operative on said clutch, an accelerator for regulating the speed of the motor and control means for the power means operatively connected to the accelerator so that movement of the accelerator to accelerate the motor causes the power means to engage the clutch progressively, while on fully decelerating the motor the clutch becomes disengaged, the drive to the free-wheel device is interrupted, the driven wheels overrun and the variable speed gear is isolated.

13. In an automobile having a driving motor, an accelerator arranged to accelerate the motor when positively operated and to decelerate the motor when released, driven road wheels and a variable speed gear, means for isolating the variable speed gear on release of the accelerator comprising the combination of automatic drive-interrupting means located between the variable speed gear and the driven wheels and including a free-wheel device and drive-interrupting means located between the motor and the variable speed gear and including a clutch, clutch-disengaging means normally operative and accelerator-controlled clutch-engaging power means energized by the motor and operative to engage the clutch progressively when the accelerator is positively operated and to maintain clutch engagement over the speed regulating range of accelerator operation, said power means being rendered inoperative on release of the accelerator and allowing the clutch disengaging means to disengage the clutch, thereby interrupting the drive to the free-wheel device, allowing the driven wheels to overrun and isolating the variable speed gear.

14. The combination as claimed in claim 13 and including a lost motion device whereby the accelerator is inoperative to regulate the motor until it has been positively operated to a degree sufficient to render the power means operative to engage the clutch.

15. In an automobile having a driving motor, an accelerator arranged to accelerate the motor when positively operated and to decelerate the motor when released, driven road wheels and a variable speed gear, means for isolating the variable speed gear on release of the accelerator comprising the combination of automatic drive interrupting means located between the variable speed gear and the driven wheels and including a free-wheel device and drive interrupting means located between the motor and the variable speed gear and including a clutch, clutch disengaging means normally operative, a hydraulic clutch engaging ram, a hydraulic pump energized by the motor, a hydraulic connection between said pump and said ram and an accelerator-controlled bypass-valve, said valve being closed over the useful motor regulating range of accelerator operation to render the ram operative to engage and maintain in engagement the clutch, while release of the accelerator opens the bypass-valve to bypass the pump delivery and allow the disengaging means to disengage the clutch, thereby interrupting the drive to the free-wheel device, allowing the driven wheels to overrun and isolating the variable speed gear.

16. The combination as claimed in claim 15 and including free-wheel locking means to permit reverse drive to be transmitted to the driven wheels.

17. In an automobile, the combination with a motor, an accelerator and driven road wheels, of a variable speed gear, a clutch disposed between the motor and the variable speed gear, power means for operating said clutch, an operative connection between the accelerator and said power means to bring about engagement and disengagement of the clutch in accordance with the movements of the accelerator, and a free-wheel device operative between the variable speed gear and the driven road wheels and cooperating with the power operated clutch, on movement of the accelerator to decelerate the motor and disengage the clutch, to isolate the variable speed gear to facilitate gear-changing.

18. In an automobile, the combination of a motor, an accelerator for the motor, a variable speed gear, a clutch between the motor and variable speed gear, driven road wheels, a free-wheel device between the variable speed gear and the driven road wheels, power-means in operative relation to cause engagement and disengagement of the clutch, and control means actuated by said accelerator and operating upon said power means to establish in one position engagement of the clutch and the transmission of power from the motor through the variable speed gear and free wheel device to the road wheels and in a second position to cause disengagement of the clutch and of the variable speed gear from the motor and of the variable speed gear from the road wheels through the free-wheel device thereby completing the isolation of the variable speed gear to enable quiet gear changing.

19. In an automobile, the combination of a motor, a variable speed gear, a clutch between the motor and variable speed gear, driven road wheels, a free-wheel device between the variable speed gear and the driven road wheels, and means for progressively engaging the clutch on accelerating the motor whereby to drive the road wheels through the variable speed gear and said free wheel device and to permit disengagement of the clutch on decelerating the motor to disconnect the variable speed gear from the motor and free the variable speed gear from the road wheels through the free wheel device thus completing the isolation of the variable speed gear for quiet gear changing.

20. In an automobile, the combination of a motor, a variable speed gear, a clutch between the motor and variable speed gear, driven road wheels, a free-wheel device between the variable speed gear and the driven road wheels, power means in operative relation to cause engagement and disengagement of the clutch, and control means operating upon said power means to establish in one position engagement of the clutch and the transmission of power from the motor through the variable speed gear and free-wheel device to the road wheels and in a second position to cause disengagement of the clutch and of the variable speed gear from the motor and of the variable speed gear from the road wheels through the free-wheel device thereby completing the isolation of the variable speed gear to enable quiet gear changing.

21. In an automobile, the combination with a motor and driven road wheels, of a variable speed gear, a clutch disposed between the motor and the variable speed gear, power means for operating said clutch, means for controlling said power means to bring about engagement and disengagement of said clutch, and a free-wheel device operative between the variable speed gear and the driven road wheels and serving in conjunction with the disengagement of the power operated clutch to isolate the variable speed gear to facilitate gear changing.

22. In a power transmission system, a motor, a change speed transmission having input and output shafts, a clutch between the motor and the input shaft of the transmission, means for controlling the speed of the motor, means actuated by operation of the first-named means to produce a selected motor speed for positively disengaging the clutch, a shaft to be driven, and an overrunning clutch connecting the output shaft of the transmission and the shaft to be driven when the speed of the former exceeds that of the latter.

23. In power transmission apparatus, a motor, a shaft to be driven, a change speed transmission between the shaft and motor, motor speed control means, means under control of the last-named means for connecting the transmission to and disconnecting the transmission from the motor and an overrunning clutch between the transmission and the shaft to be driven.

24. In a vehicle having an engine, a power transmitting system including an inter-connected main clutch, variable speed gear transmission mechanism and a propeller shaft; means providing a one-way driving connection between said transmission mechanism and said propeller shaft for permitting overrunning of the latter with respect to said transmission mechanism during shifting of the gears of the latter; and means responsive to decelerating of said engine prior to shifting of said transmission mechanism for automatically disengaging said main clutch so as to permit simultaneous over-running of both said engine and propeller shaft with respect to said transmission mechanism during the gear shifting operation.

25. In a vehicle having an engine, a power transmitting system including an inter-connected main clutch, variable speed gear transmission mechanism and a propeller shaft; means operable by said engine for engaging and disengaging said main clutch automatically when the speed of said engine is increased above and decreased to its idling rate respectively; and an over-running clutch providing a one-way driving connection between said transmission mechanism and said propeller shaft, and permitting the latter to over-run said transmission mechanism so as to relieve the transmission of all driving loads during shifting of the gear thereof.

26. In a vehicle having an engine, a variable speed transmission mechanism and a driven member; automatic clutch actuating mechanism operable by said engine for engaging and disengaging the elements of said main clutch; and a coupling between said transmission and driven member having relatively rotatable clutch members and including means for holding said member against relative rotation thereof only after a limited relative rotation so as to enable rigid engagement of the main clutch elements prior to application of the road torque on said transmission mechanism.

27. In a vehicle propelling system, a driven member, an engine having a carburetor including a throttle valve, means for regulating said throttle valve, a variable speed transmission mechanism, a releasable clutch between said engine and said transmission mechanism, automatic clutch operating apparatus having a control element operable by said throttle regulating means and adapted to effect disengagement of said clutch when the control is placed in its idling position, and a one-way driving connection between said driven member and said transmission adapted to permit over-running of the driving member with respect to said transmission mechanism when the clutch between the latter and said engine is disengaged.

28. In a vehicle propelling system, an engine, variable speed transmission mechanism, a main clutch for selectively providing a driving connection between said engine and said transmission mechanism, power clutch actuating mechanism for engaging and disengaging said main clutch, a driven member, and a one-way driving connection between said transmission and said driven member.

29. In a vehicle having an engine, a power transmission system including an interconnected main clutch, variable speed transmission mechanism and a driven member; means for providing a one-way driving connection between said transmission mechanism and said driven member for permitting over-running of the latter with respect to said transmission mechanism when the speed of operation of the latter is reduced in preparation for effecting a change in the gear ratio thereof; and a power clutch actuating mechanism for engaging and disengaging said main clutch.

30. In an automobile having a driving motor and an accelerator for regulating the speed of the motor, the combination with a clutch of power means operated by the motor and adapted to control the disengagement and engagement of the clutch, said power means including valve means operatively connected to the accelerator and operable to initiate the clutch disengaging and engaging operations of the power means, and further including other means operable to control the clutch engaging operation of the power means in accordance with the absolute speed of the motor.

31. In an automotive vehicle provided with an internal-combustion engine, an accelerator and a clutch, power means for controlling the operation of the clutch, said means comprising valvular means operated by the accelerator and operative to initiate disengagement and engagement of the clutch, and further comprising other means, supplementing the aforementioned valvular means and operable in accordance with the engine speed to control the rate of clutch engagement, said engine speed being controlled in part by the accelerator.

32. In an automotive vehicle provided with an internal-combustion engine, an accelerator, and a clutch, power means for controlling the operation of the clutch, said means comprising valvular means operated by the accelerator and operative to initiate disengagement and engagement of the clutch, and further comprising other means, supplementing the aforementioned valvular means and operable in accordance with the R. P. M. of the engine, to regulate the rate of engagement of the clutch.

33. In an automotive vehicle provided with an internal-combustion engine, an accelerator and a clutch, power means for operating the clutch, said means comprising valvular means operated by the accelerator and operative to initiate the disengagement and engagement of the clutch, and further comprising means, operated by the internal-combustion engine and in accordance with the speed thereof, to regulate the rate of engagement of the clutch.

34. In an automobile having a driving motor and an accelerator for regulating the speed of the motor, the combination with a clutch of clutch operating power means comprising a hydraulic ram mechanism operatively connected with the clutch, a normally continuously circulating power fluid for controlling the energization of the ram mechanism, accelerator operated valve means operative to initiate the clutch disengaging and engaging operations of the ram mechanism, and means operable by the driving motor to regulate automatically the clutch engaging operation of the ram in accordance with the speed of the motor.

35. In an automotive vehicle provided with an internal combustion engine, an accelerator and a clutch, power means for operating the clutch to disengage and engage the same, and accelerator-operated means operable to initiate both the clutch-disengaging and engaging operations of the power means, said power means including means for controlling the rate of engagement of the clutch in accordance with the speed of the engine.

36. In an automotive vehicle provided with an internal combustion engine, an accelerator and a clutch, power means for controlling the clutch-engaging and clutch-disengaging movements of the clutch, and means for controlling the operation of said power means including a fluid pressure system having a valve operatively connected with the accelerator and having also a device operable in accordance with the speed of the engine, said device being effective in said system to regulate the clutch-engaging movement of said power means.

EDWARD HENRY JAMES CECIL GILLETT.